United States Patent
Yonekura et al.

(10) Patent No.: US 7,269,963 B2
(45) Date of Patent: Sep. 18, 2007

(54) VEHICLE AIR CONDITIONING APPARATUS

(75) Inventors: Mitsuru Yonekura, Shioya-gun (JP); Junya Washiashi, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 391 days.

(21) Appl. No.: 11/004,558

(22) Filed: Dec. 3, 2004

(65) Prior Publication Data

US 2005/0121185 A1 Jun. 9, 2005

(30) Foreign Application Priority Data

Dec. 4, 2003 (JP) ............................. 2003-405764
Feb. 6, 2004 (JP) ............................. 2004-030497

(51) Int. Cl.
*B60H 1/00* (2006.01)
*B60H 3/00* (2006.01)

(52) U.S. Cl. ............................. 62/133; 62/158; 62/209; 62/244; 165/42; 165/202

(58) Field of Classification Search ................. 62/133, 62/157, 158, 208, 209, 244; 165/42, 201, 165/202
See application file for complete search history.

(56) References Cited

U.S. PATENT DOCUMENTS

| 6,202,934 B1 * | 3/2001 | Kamiya et al. ........... 236/91 C |
| 6,715,540 B2 * | 4/2004 | Kobayashi et al. ......... 165/202 |
| 7,143,590 B2 * | 12/2006 | Tomita ........................ 62/126 |
| 2004/0163395 A1 * | 8/2004 | Ichishi et al. ................. 62/126 |

FOREIGN PATENT DOCUMENTS

| EP | 1293367 A2 | 3/2003 |
| EP | 1293367 A3 | 3/2003 |
| JP | 63-180514 | 7/1988 |
| JP | 05-345515 | 12/1993 |
| JP | 8-20227 | 1/1996 |
| JP | 10-44763 | 2/1998 |
| JP | 10119729 A * | 5/1998 |
| JP | 2001-334820 | 12/2001 |
| JP | 2001-347816 | 12/2001 |
| JP | 2002-327965 | 11/2002 |
| JP | 2003-312228 A | 11/2003 |

OTHER PUBLICATIONS

Japanese Office Action for Application No. 2004-030497, dated May 8, 2007.

* cited by examiner

*Primary Examiner*—Marc Norman
(74) *Attorney, Agent, or Firm*—Lahive & Cockfield, LLP; Anthony A. Laurentano, Esq.

(57) ABSTRACT

Parameters are set in accordance with a running condition of a vehicle and an environmental condition based on a wiper operation signal of the vehicle. The parameters are used to calculate a stable vehicle interior surface temperature Tna of a window glass. The stable vehicle interior surface temperature Tna and a vehicle interior surface temperature Tn1 calculated at previous sampling are used to calculate a vehicle interior surface temperature Tn in a transient state considering response delay time τ of temperature change. A control temperature, at which no dew is formed on the window glass, is determined in accordance with the obtained vehicle interior surface temperature Tn to perform air conditioning control.

8 Claims, 8 Drawing Sheets

VEHICLE AIR CONDITIONING APPARATUS

BACKGROUND OF THE INVENTION

1. Field of the Invention

The present invention relates to a vehicle air conditioning apparatus which performs air conditioning in a vehicle passenger compartment so that a window glass of the vehicle is not clouded by controlling a heating means and a cooling means.

2. Description of the Related Art

A vehicle air conditioning apparatus adjusts the temperature and the humidity in the vehicle passenger compartment by a vaporizer which cools the air and performs dehumidification by utilizing the heat of vaporization of cooling medium, together with a heater which heats the air by utilizing the heat of engine cooling water or the like.

When the temperature is low and the vaporizer is controlled so that the cooling performance of the vaporizer is lowered, then dehumidifying performance is reduced as well. Therefore, for example, when the temperature is low and the humidity is high, water vapor in the vehicle passenger compartment may be subjected to dew formation on the window glass.

In order to solve this problem, the vehicle air conditioning apparatus is controlled so that vehicle interior absolute humidity is lower than window glass dew point absolute humidity. For this purpose, it is necessary that the vehicle interior surface temperature of the window glass is determined correctly, and the window glass dew point absolute humidity is calculated from the temperature.

As for the vehicle interior surface temperature of the window glass, the temperature can be measured highly accurately, for example, by directly attaching a temperature sensor to the window glass. However, it is necessary to provide an exclusively equipped temperature sensor as well as a processing circuit and cable wiring for processing a signal from the temperature sensor. Therefore, the system may be expensive.

In view of the above, Japanese Patent No. 3298151 has proposed a method in which the vehicle interior surface temperature of the window glass is estimated by using measured values obtained by an outside air temperature sensor, a vehicle interior temperature sensor, and a solar radiation amount sensor which are essential constitutive elements to control the vehicle air conditioning apparatus. In this method, it is unnecessary to provide any exclusively equipped temperature sensor for detecting the vehicle interior surface temperature of the window glass. Further, it is unnecessary to provide the processing circuit and the cable wiring. Therefore, for example, it is unnecessary to change the hardware specification. This system is extremely advantageous in view of cost.

In the case of the method described above, for example, when environmental conditions such as outside air temperature and solar radiation amount are not suddenly changed, the vehicle interior surface temperature of the window glass is stable. Therefore, the temperature can be estimated highly accurately by using the outside air temperature sensor, the vehicle interior temperature sensor, and the solar radiation amount sensor.

However, when the environmental conditions are suddenly changed, the measured values obtained by the respective sensors are quickly changed, following the environmental change. Then, the vehicle interior surface temperature is promptly calculated from the measured values. However, it takes a certain period of time the actual vehicle interior surface temperature of the window glass to reach a stable temperature due to the influence of the thermal capacity of the window glass or the like. Therefore, the estimated temperature is considerably deviated from the actual vehicle interior surface temperature. Further, the vehicle interior surface temperature of the window glass does not change immediately after the change of the vehicle exterior surface temperature. The temperature changes after the elapse of the response delay time depending on the thickness of the window glass and the coefficient of thermal conductivity of the glass. Therefore, in this case, according to the method disclosed in Japanese Patent No. 3298151, it is impossible to appropriately control the vehicle interior absolute humidity, and the window glass may be clouded.

SUMMARY OF THE INVENTION

A general object of the present invention is to provide a vehicle air conditioning apparatus which makes it possible to perform appropriate air conditioning control without forming any dew on the window glass.

A principal object of the present invention is to provide a vehicle air conditioning apparatus which highly accurately estimates a vehicle interior surface temperature of the window glass while considering the change of running conditions and environmental conditions and which makes it possible to perform appropriate air conditioning control without forming any dew on the window glass by using an extremely simple and convenient system.

Another object of the present invention is to provide a vehicle air conditioning apparatus which makes it possible to perform air conditioning control while considering the transient change of the window glass temperature.

According to a vehicle air conditioning apparatus of the present invention, when the vehicle exterior surface temperature of the window glass is changed depending on the running conditions and the environmental conditions of the vehicle, then the vehicle interior surface temperature of the window glass starts changing while delaying by a period of time corresponding to the thickness of the window glass and the coefficient of thermal conductivity of the glass, and the vehicle interior surface temperature of the window glass is changed in a transit manner. Taking the changes into consideration, the vehicle interior surface temperature is estimated highly accurately. The vehicle interior surface temperature is used to perform the air conditioning control without any condensation or dew on the window glass.

If the elapsed time from calculation start time of the vehicle interior surface temperature is shorter than the response delay time until the vehicle interior surface temperature starts to change, it is assumed that the vehicle interior surface temperature is a vehicle interior surface temperature in a stable state at the start time of the calculation.

In the vehicle air conditioning apparatus of the present invention, the air conditioning control is performed while considering the response delay of the vehicle interior surface temperature of the window glass and the transient change. Accordingly, it is possible to realize an extremely simple and convenient system for air conditioning control without any condensation or dew on the window glass.

Further, it is possible to highly accurately estimate the vehicle interior surface temperature of the window glass based on the running conditions and the environmental conditions of the vehicle. Therefore, it is possible to perform appropriate air conditioning control in which no dew is formed on the window glass, in accordance with the estimated vehicle interior surface temperature.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
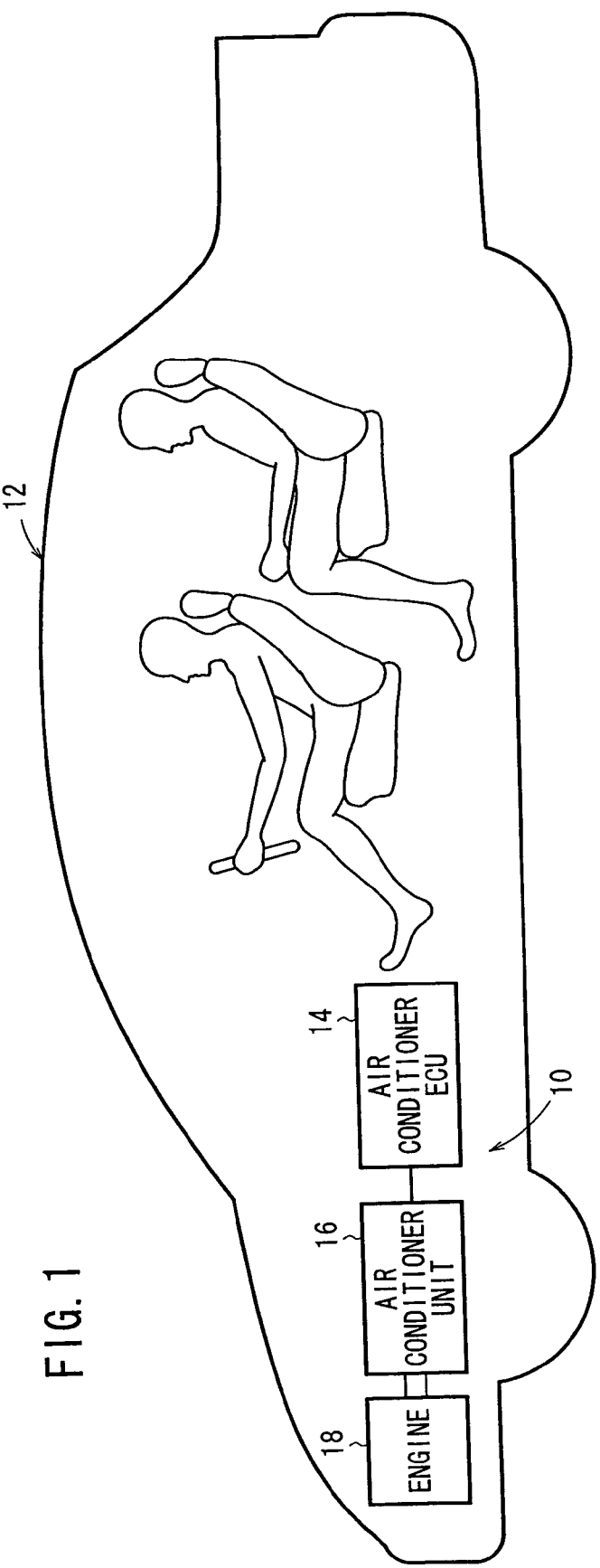
FIG. 1 illustrates a vehicle which carries a vehicle air conditioning apparatus according to an embodiment of the present invention.
Figure 2:
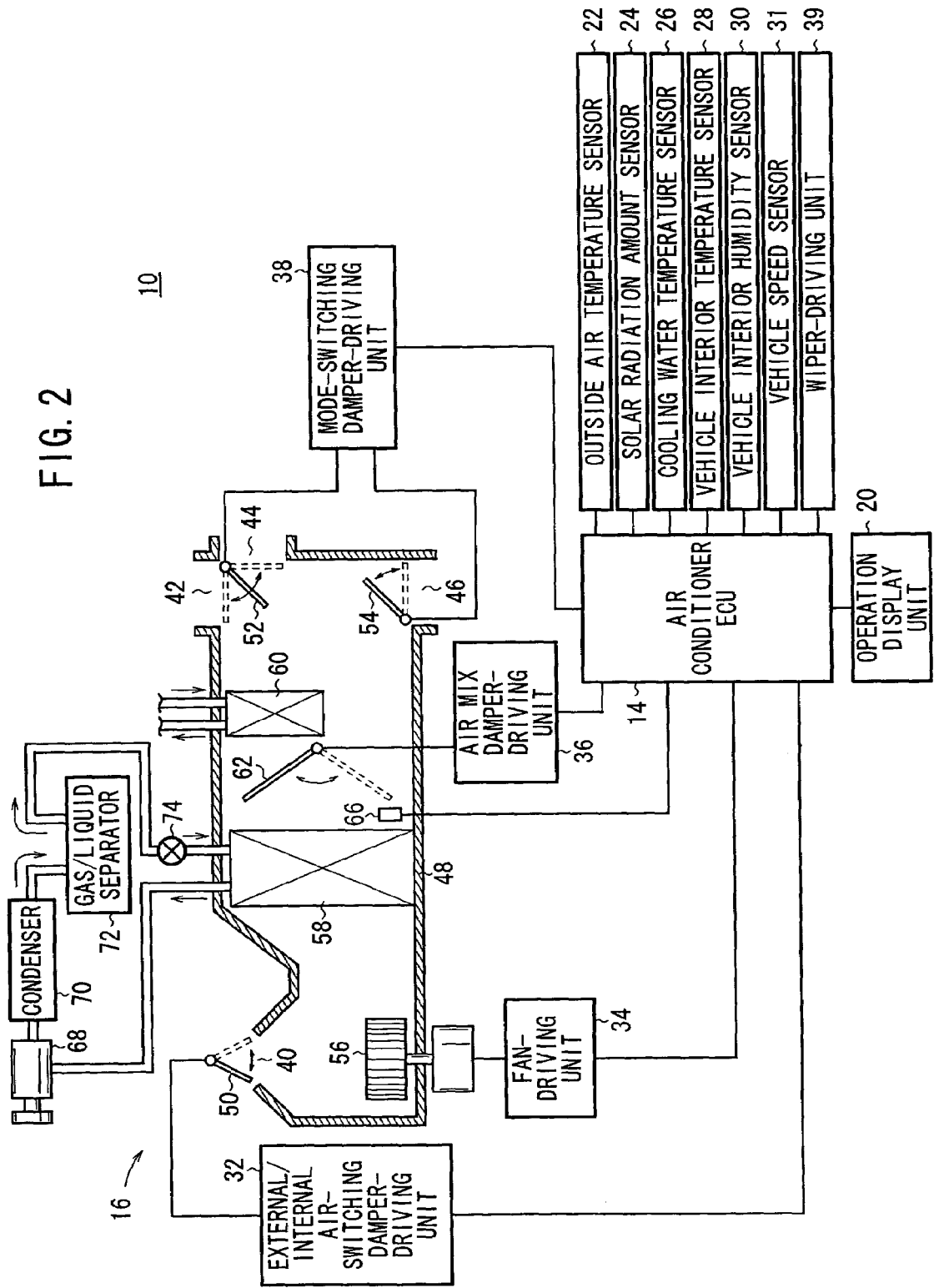
FIG. 2 shows an arrangement of the vehicle air conditioning apparatus according to the embodiment of the present invention.

FIG. 1 shows a vehicle 12 which carries a vehicle air conditioning apparatus 10 according to an embodiment of the present invention. As shown in FIG. 2, the vehicle air conditioning apparatus 10 comprises an air conditioner ECU (Electronic Control Unit) 14, and an air conditioner unit 16 which adjusts the temperature, the humidity, and the amount of air based on the control of the air conditioner ECU 14. Cooling water is supplied from an engine 18 to the air conditioner unit 16.

The air conditioner ECU 14 is connected to an operation display unit 20 on which a passenger in the vehicle 12 operates such as setting temperature or the amount of the air, and switching modes. The operation display unit 20 also displays the set temperature, the set air amount, and the set mode and so on.

Further, the air conditioner ECU 14 is connected to an outside air temperature sensor 22 which detects the outside air temperature of the vehicle 12, a solar radiation amount sensor 24 which detects the solar radiation amount, a cooling water temperature sensor 26 which detects the temperature of cooling water supplied from the engine 18, a vehicle interior temperature sensor 28 which detects the interior temperature of the vehicle 12, a vehicle interior humidity sensor 30 which detects the interior humidity of the vehicle 12, and a vehicle speed sensor 31 which detects the speed of the vehicle 12.

Further, the air conditioner ECU 14 is connected to an external/internal air-switching damper-driving unit 32, a fan-driving unit 34, an air mix damper-driving unit 36, and a mode-switching damper-driving unit 38. The air conditioner unit 16 is made up of the external/internal air-switching damper-driving unit 32, the fan-driving unit 34, the air mix damper-driving unit 36, and the mode-switching damper-driving unit 38. A wiper-driving unit 39 is connected to the air conditioner ECU 14, and drives a wiper provided on the window glass. A wiper operation signal is supplied from the wiper-driving unit 39.

The air conditioner unit 16 is provided with a duct 48 which includes an external/internal air intake port 40 for introducing external or internal air, and blow ports 42, 44, 46. The blow ports 42, 44, 46 supply the air to predetermined positions in the vehicle passenger compartment. The temperature, the humidity, and the amount of the air are adjusted. An external/internal air-switching damper 50, which is driven by the external/internal air-switching damper-driving unit 32 and which switches the external air and the internal air, is arranged at the external/internal air intake port 40. Mode-switching dampers 52, 54 are arranged at the blow ports 42, 44, 46, and driven by the mode-switching damper-driving unit 38 for directing the respective blow ports 42, 44, 46 to a defroster side, a face side, and a foot side in the vehicle passenger compartment.

A fan 56, which is disposed closely to the external/internal air intake port 40 and which is driven by the fan-driving unit 34, is arranged in the duct 48. A vaporizer 58, which cools and dehumidifies the air, is arranged at an internal intermediate portion of the duct 48 and on the downstream side of the fan 56 with respect to the air flowing therethrough. A heater 60 is arranged between the vaporizer 58 and the blow ports 42, 44, 46. The heater 60 heats the air passing through the vaporizer 58 by using cooling water supplied from the engine 18. In this arrangement, an air mix damper 62 driven by the air mix damper-driving unit 36 is arranged between the vaporizer 58 and the heater 60. The air mix damper 62 adjusts the amount of the air passing through the vaporizer 58 to the heater 60.

A vaporizer outlet temperature-detecting sensor 66, which detects the vaporizer outlet temperature of the air, is arranged on the outlet of the vaporizer 58. The vaporizer outlet temperature-detecting sensor 66 is connected to the air conditioner ECU 14.

The air conditioner unit 16 is provided with a compressor 68 which is driven by the rotational force of the engine 18 to compress the cooling medium, a condenser 70 which condenses the cooling medium compressed by the compressor 68, a gas/liquid separator 72 which separates the cooling medium condensed by the condenser 70 into a liquid component and a gas component, and an expansion valve 74 which supplies the gas component of the cooling medium to the vaporizer 58 after expanding the gas component of the cooling medium separated by the gas/liquid separator 72. The cooling medium, which is supplied to the vaporizer 58, is supplied to the compressor 68 in a circulating manner.

The vehicle air conditioning apparatus 10 according to the embodiment of the present invention is basically constructed as described above.

The vehicle air conditioning apparatus 10 according to the embodiment of the present invention makes it possible to optimize air conditioning control in which no dew is formed especially on a window glass by controlling the temperature and the humidity in the vehicle passenger compartment by using the information from the respective sensors supplied to the air conditioner ECU 14. In this case, in order to avoid condensation or dew on the window glass, it is necessary that a vehicle interior absolute humidity should be lower than a dew point absolute humidity of the vehicle interior surface of the window glass. The dew point absolute humidity of the window glass is determined by the vehicle interior surface temperature of the window glass.

When the temperature of the window glass is stable, a stable vehicle interior surface temperature Tna of the window glass at time tA is estimated as follows.

$$Tna = [(Kn\lambda + 2KnLKg)/(Kn\lambda + Kg(\lambda + 2KnL))]Tr + \qquad (1)$$
$$[\lambda Kg/Kn\lambda + Kg(\lambda + 2KnL))]Tam +$$
$$1/A[(\lambda + LKg)/(Kn\lambda + Kg(\lambda + 2KnL))]Qs$$

Tr: a vehicle interior temperature at time tA;
Tam: an outside air temperature at time tA;
Qs: a solar radiation absorption amount of a window glass at time tA;
L: a thickness of a window glass;
$\lambda$: a coefficient of thermal conductivity of a glass;
A: a glass surface area;
Kg: an outside air coefficient of thermal conductivity at time tA;
Kn: a vehicle interior coefficient of thermal conductivity at time tA.

Assuming that the values of the respective parameters of the relational expression (1) to affect the temperature of the window glass are continuously stabilized as values at the time tA, it can be expected that the vehicle interior surface temperature of the window glass is stable at the stable vehicle interior surface temperature Tna.

On the other hand, the window glass has a predetermined coefficient of thermal conductivity of the glass and a predetermined thickness. Therefore, if the outside air temperature Tam and a solar radiation amount Ts (outside environmental conditions) are changed, then the vehicle interior surface temperature of the window glass starts to change after the elapse of a predetermined response delay time $\tau$ from the change of outside environmental conditions, and then changes in a transient manner. In this case, a vehicle interior surface temperature Tn of the window glass in the transient state at the time tA can be approximately estimated as follows by using an initial value Tn1 of the vehicle interior surface temperature Tn, elapsed time t from the state of the initial value Tn1 to the time tA, the response delay time $\tau$ of the temperature change of the vehicle interior surface of the window glass, and the stable vehicle interior surface temperature Tna assuming that the respective parameters of the relational expression (1) are continuously stabilized as the values at the time tA.

$$Tn' = Tna - (Tna - Tn1)\exp(-\alpha t/L A\rho C) \qquad (2)$$

$$Tn \approx Tn\tau' \qquad (3)$$

(Tn$\tau$': a vehicle interior surface temperature Tn' calculated before time tA by response delay time $\tau$, $\rho$: glass density, C: glass specific heat).

The value $\alpha$ is defined as follows.

$$\alpha = (Kn A\lambda + Kg A(\lambda + 2KnL)/(\lambda + KgL) \qquad (4)$$

When the vehicle interior temperature Tr (vehicle interior environmental condition) is changed, the vehicle interior surface temperature of the window glass starts to change simultaneously with the change of the vehicle interior environmental condition. Therefore, the vehicle interior surface temperature Tn with respect to the change of the vehicle interior environmental condition can be derived from the relational expression (3) in which $\tau=0$. However, the vehicle interior environmental condition is not changed suddenly in ordinary use of the vehicle 12. Therefore, it is possible to use the relational expression (2) as it is for calculating the vehicle interior surface temperature Tn. It is also possible to consider that the vehicle interior coefficient of thermal conductivity Kn is also constant irrelevant to the time, because the vehicle interior environmental condition is not changed suddenly.

The vehicle interior surface temperature Tn at the time tA also depends on environmental and running conditions of the vehicle 12.

For example, a vehicle exterior surface temperature Tg of the window glass at the time tA will differ depending on whether water droplets are adhered to the exterior surface of the window glass or not. Accordingly, the outside air temperature Tam at the time tA, which is detected by the outside air temperature sensor 22, is substituted with $\xi$Tam by using a water droplet temperature changing rate $\xi$ considering water droplets by environmental conditions such as rain and snow. It is assumed that $\xi=1$ when it does not rain or snow.

It is considered that the outside air coefficient of thermal conductivity Kg is proportional to a vehicle speed V as the running condition at the time tA. The coefficient Kg is affected by the environmental conditions such as rain or snow. Accordingly, the outside air coefficient of thermal conductivity Kg at the time tA is substituted with $\psi(xV+y)$ by using parameters x, y and a coefficient of thermal conductivity changing rate $\psi$ depending on rain or snow. The ratio $\psi=1$ when it does not rain or snow.

Further, it is possible to consider that the elapsed time t is a constant, assuming that the elapsed time t, ranging from the time at which the vehicle interior surface temperature is the initial value Tn1 to the time tA, is a sampling time interval for the calculation by the air conditioner ECU 14 in the relational expressions (2) and (3). The time tA is the time at each sampling timing. Assuming that the outside air coefficient of thermal conductivity Kg at the time tA for a parameter $\alpha$ of the relational expression (2) can be approximated as a function of the vehicle speed V, the following substitution can be made by using parameters w, z and a change ratio $\omega$ depending on rain or snow.

$$\exp[-\alpha t/L A\rho C] = \omega(wV+z) \qquad (5)$$

The ratio $\omega=1$ when it does not rain or snow.

As a result, the vehicle interior surface temperature Tn at the time tA in the transient state represented by the relational expressions (2) and (3) can be approximated as follows.

$$Tn' = Tna - (Tna - Tn1)\omega(wV+z) \qquad (6)$$

$$Tn \approx Tn\tau' \qquad (7)$$

(Tn$\tau$': a vehicle interior surface temperature Tn' calculated before time tA by response delay time $\tau$ in the relational expression (6)).

The stable vehicle interior surface temperature Tna at the time tA, which is represented by the relational expression (1), can be substituted as follows by considering the running and environmental conditions of the vehicle 12.

$$Tna = [(Kn\lambda + 2KnLKg)/(Kn\lambda + Kg(\lambda + 2KnL))]Tr + \qquad (8)$$
$$[\lambda Kg/Kn\lambda + Kg(\lambda + 2KnL))]\xi Tam +$$
$$1/A[(\lambda + LKg)/(Kn\lambda + Kg(\lambda + 2KnL))]\varepsilon Ts$$

The outside air coefficient of thermal conductivity Kg at the time tA is as follows.

$$Kg = \psi(xV+y) \quad (9)$$

Further, εTs indicates the solar radiation absorption amount Qs of the window glass at the time tA, which is converted into the solar radiation amount Ts by using the solar radiation amount conversion coefficient ε.

Figure 3:
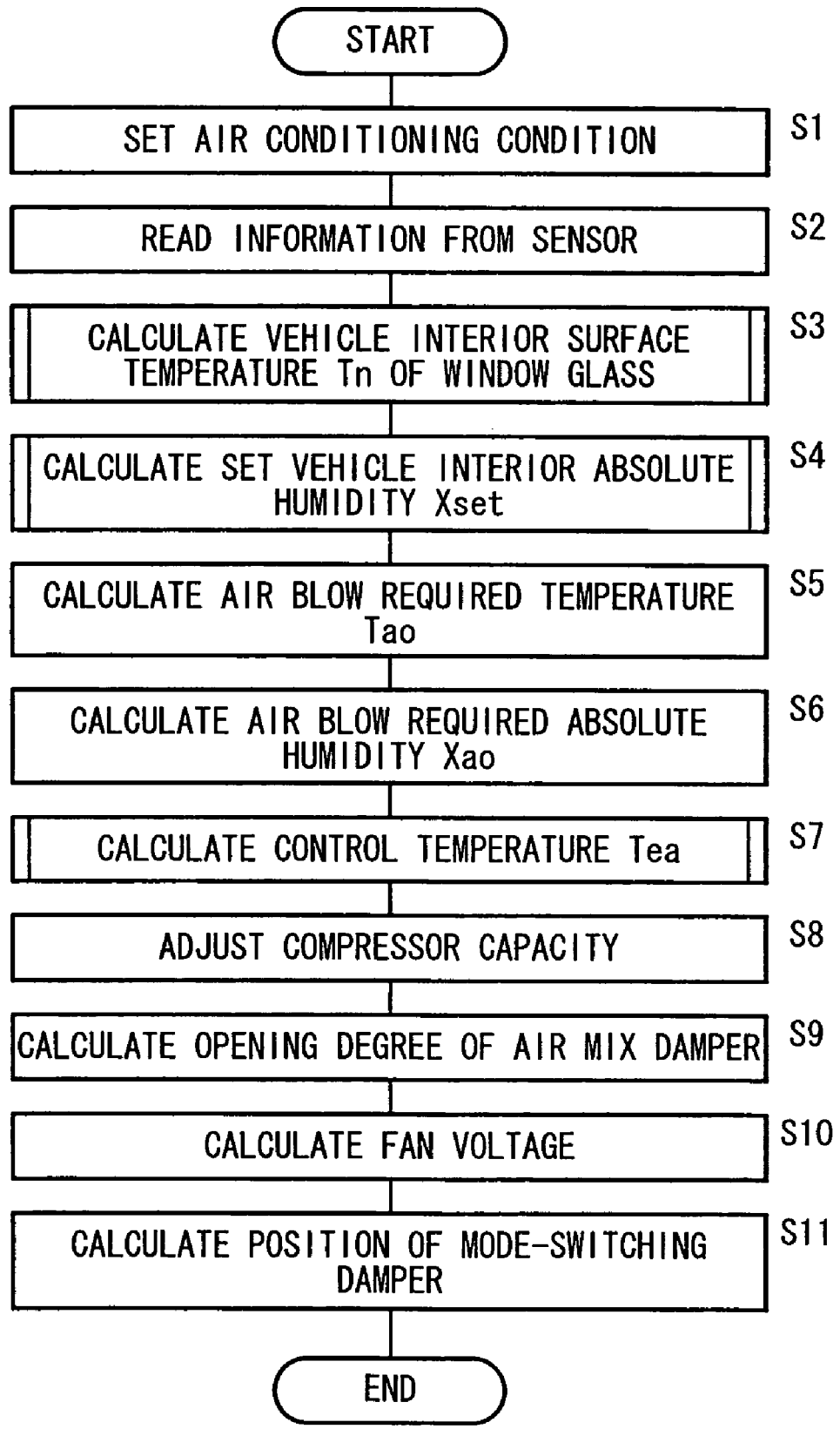
FIG. 3 is a process flow chart for the vehicle air conditioning apparatus according to the embodiment of the present invention.

Next, an explanation will be made in accordance with a flow chart shown in FIG. 3 about the operation of the vehicle air conditioning apparatus 10 based on the use of the vehicle interior surface temperature Tn of the window glass estimated by the relational expressions (6) to (9).

First, the passenger of the vehicle 12 turns on the power source of the vehicle air conditioning apparatus 10. Then, the operation display unit 20 is operated to set a desired air amount and a desired temperature. Further, the mode is set by switching the external/internal air-switching damper 50 and the mode-switching dampers 52, 54 (Step S1).

When air conditioning conditions are set in Step S1, the air conditioner ECU 14 reads information of the respective sensors at the time tA from the outside air temperature sensor 22, the solar radiation amount sensor 24, a cooling water temperature sensor 26, the vehicle interior temperature sensor 28, the vehicle interior humidity sensor 30, the vehicle speed sensor 31, and the vaporizer outlet temperature-detecting sensor 66 arranged in the vehicle 12 (Step S2).

Figure 4:
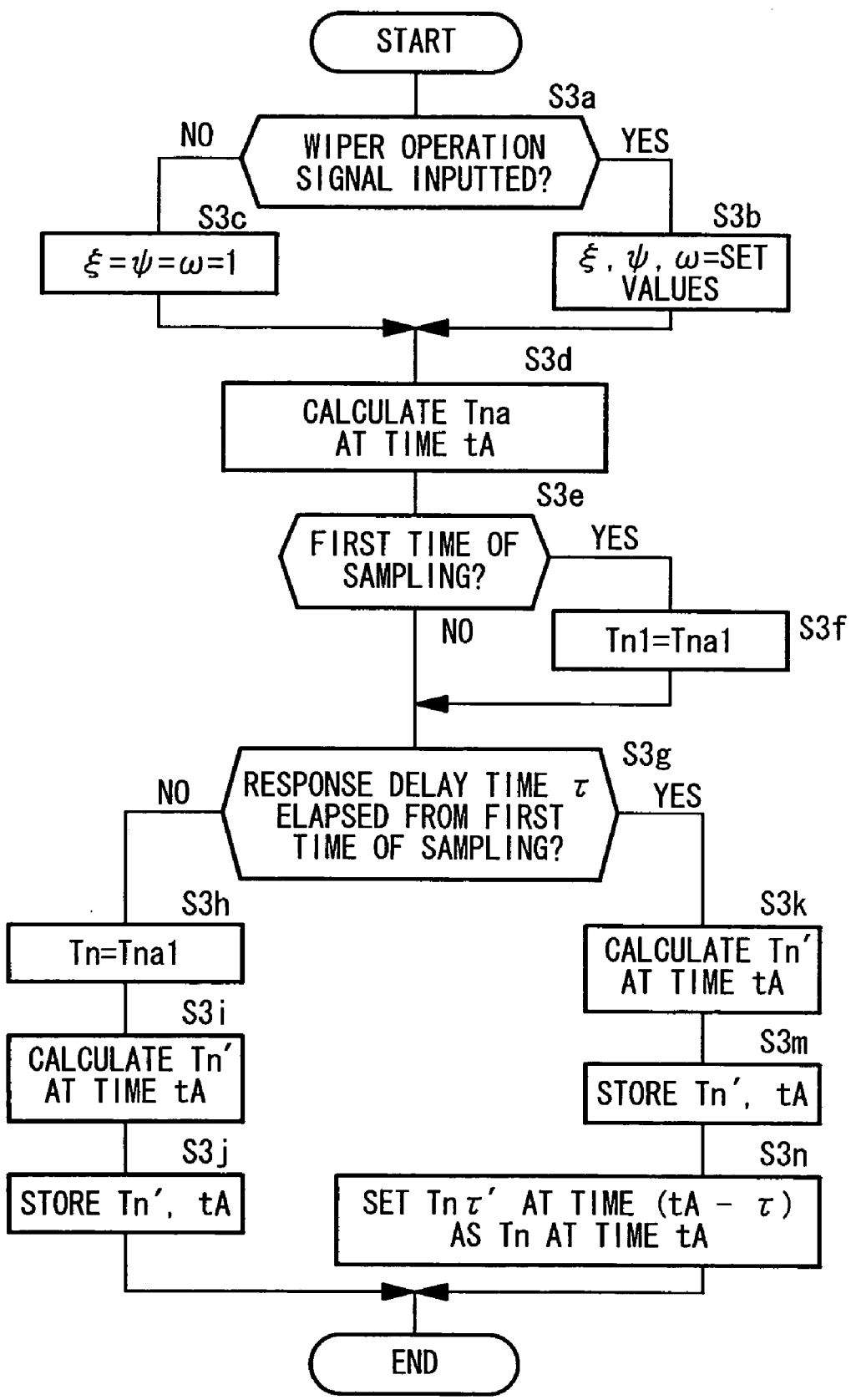
FIG. 4 is a calculation flow chart for the vehicle interior surface temperature of the window glass in relation to the flow chart shown in FIG. 3.

Subsequently, the air conditioner ECU 14 calculates the vehicle interior surface temperature Tn of the window glass at the time tA in accordance with a flow chart shown in FIG. 4 (Step S3).

The air conditioner ECU 14 confirms the input of the wiper operation signal from the wiper-driving unit 39 (Step S3a). If the wiper operation signal is inputted, it is judged that the passenger operates the wiper because the environmental condition of the vehicle 12 is rain or snow. The water droplet temperature changing rate ξ, the coefficient of thermal conductivity changing rate ψ, and the change ratio ω are set to be predetermined preset values (Step S3b). On the other hand, if the wiper operation signal is not inputted, it is judged that it does not rain or snow. All the water droplet temperature changing rate ξ, the coefficient of thermal conductivity changing rate ψ, and the change ratio ω are set to 1 (Step S3c). The stable vehicle interior surface temperature Tna at the time tA is calculated (Step S3d) in accordance with the relational expression (8) by using the outside air coefficient of thermal conductivity Kg calculated on the basis of the vehicle speed V at the time tA detected by the vehicle speed sensor 31.

In place of the judgment of the environmental conditions of the vehicle 12 on the basis of the wiper operation signal, for example, the environmental conditions of the vehicle 12 may be judged in accordance with the sensor information obtained from a raindrop sensor. Alternatively, the environmental conditions of the vehicle 12 can be also judged by a sudden decrease in the outside air temperature Tam detected by the outside air temperature sensor 22.

Subsequently, if the stable vehicle interior surface temperature Tna at the time tA, which is calculated in Step S3d, is the calculated value of the first time sampling (time t1 upon turning on the power source of the vehicle air conditioning apparatus 10) (Step S3e), the initial value Tn1 is regarded as the stable vehicle interior surface temperature Tna (=Tna1) calculated at the time t1 (Step S3f) in the relational expression (6).

Figure 5:
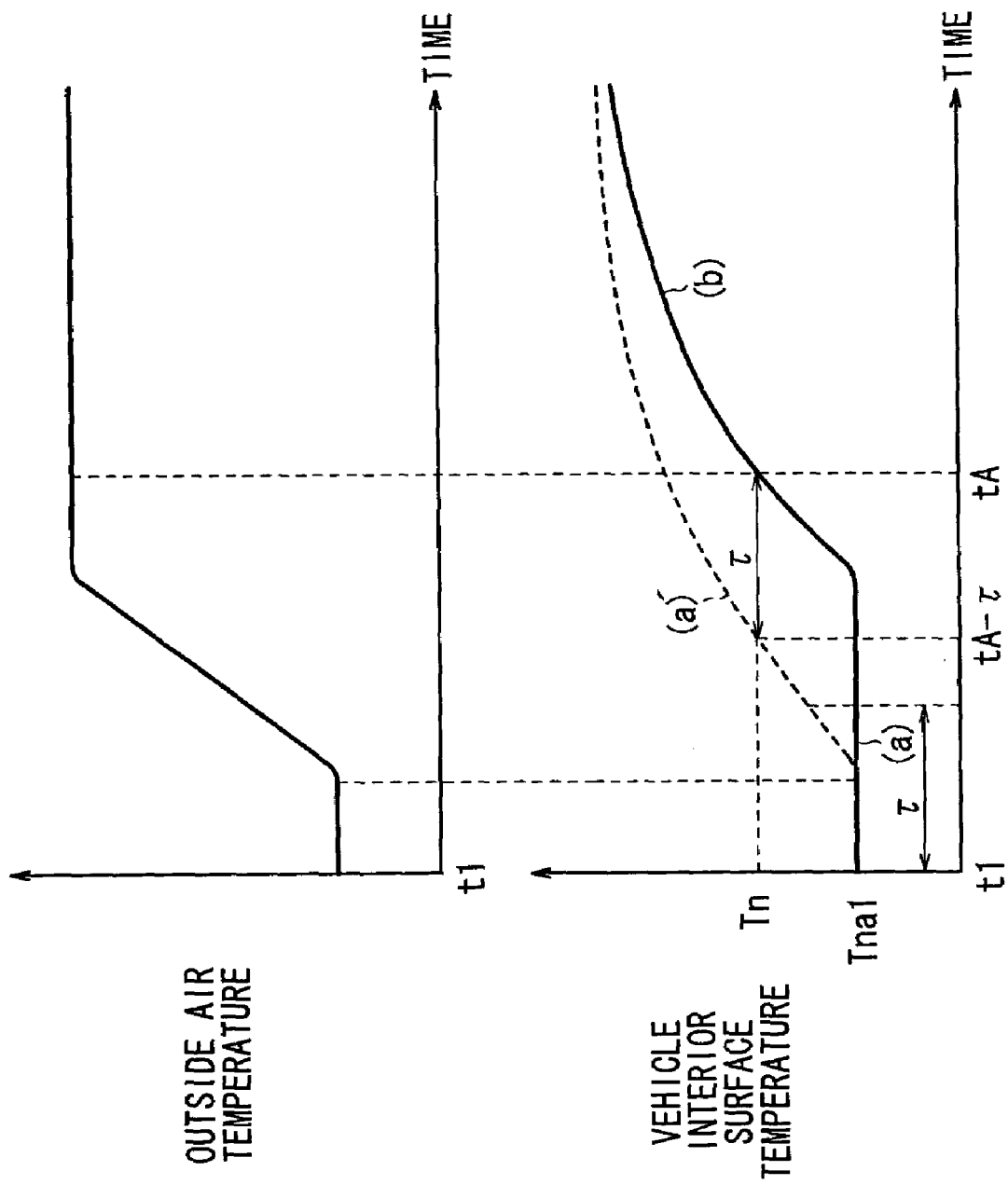
FIG. 5 illustrates the relationship between the outside air temperature of the vehicle and the estimated vehicle interior surface temperature of the window glass.

Subsequently, the vehicle interior surface temperature Tn of the window glass at the time tA is estimated in accordance with the relational expressions (6) and (7). FIG. 5 shows the relationship between the outside air temperature Tam detected by the outside air temperature sensor 22 and the vehicle interior surface temperature Tn in the transient state of the window glass estimated in accordance with the relational expressions (6) and (7).

If the calculation time tA of the vehicle interior surface temperature Tn does not elapse the response delay time τ from the start of the calculation as the first time of the sampling (time t1 upon the turning on of the vehicle air conditioning apparatus 10) (Step S3g), it is considered that the vehicle interior surface temperature of the window glass is scarcely changed from the value at the time t1. Therefore, the vehicle interior surface temperature Tn is regarded as the stable vehicle interior surface temperature Tna (=Tna1) calculated at the time t1 (Step S3h, see the temperature curve (a)). Further, the vehicle interior surface temperature Tn' is calculated from the relational expression (6) (see the temperature curve (a)') (Step S3i). The vehicle interior surface temperature Tn' at the time tA and the time tA are stored in an unillustrated memory of the air conditioner ECU 14 (Step S3j). It is assumed that the elapsed time t in the relational expression (5) to derive the relational expression (6) is set as the sampling time interval for the calculation by the air conditioner ECU 14.

If the time tA for calculating the vehicle interior surface temperature Tn elapses the response delay time τ from the start of the calculation as the first time of the sampling (Step S3g), the relational expression (6) is used to calculate the vehicle interior surface temperature Tn' at the time tA (Step S3k). The vehicle interior surface temperature Tn' at the time tA and the time tA are stored in the unillustrated memory of the air conditioner ECU 14 (Step S3m). Subsequently, the vehicle interior surface temperature Tn at the time tA is regarded as the vehicle interior surface temperature Tnτ' at the previously stored time (tA−τ) on the basis of the relational expression (7) to set the vehicle interior surface temperature Tn of the window glass in the transient state (see the temperature curve (b)) (Step S3n). In this procedure, it is possible to highly accurately estimate the vehicle interior surface temperature Tn at the time tA in the transient state considering the response delay time τ and the changes of the outside air temperature Tam and the running conditions and the environmental conditions of the vehicle 12.

In Step S3g, the number of samplings corresponding to the response delay time τ may be judged in place of the judgment of the elapse of the response delay time τ to estimate the vehicle interior surface temperature Tn at the time tA. In Step S3n, in place of the setting of the vehicle interior surface temperature Tn in accordance with the response delay time τ, it is also possible to estimate the vehicle interior surface temperature Tn in accordance with the number of samplings corresponding to the response delay time τ.

Figure 6:
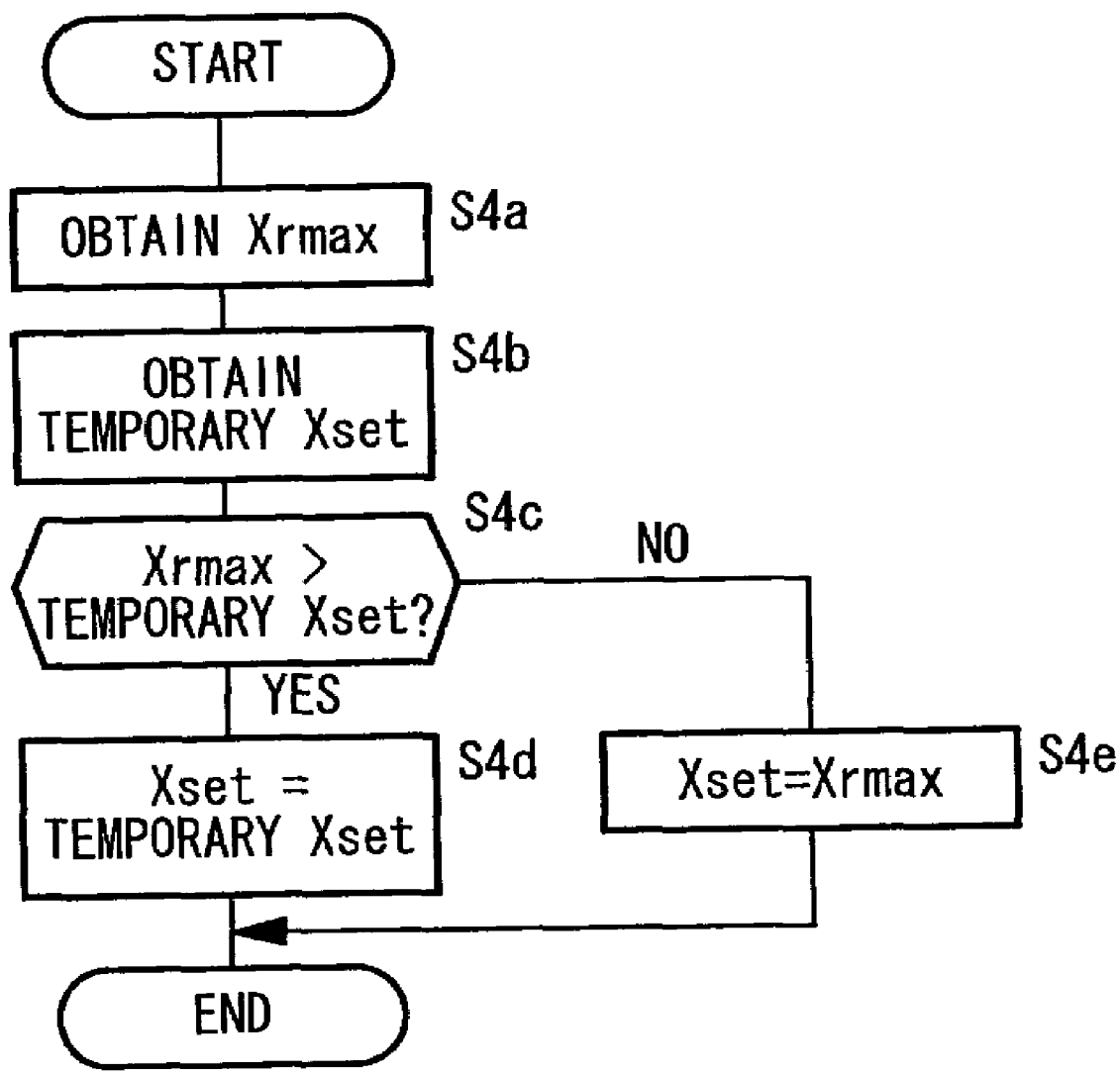
FIG. 6 is a calculation flow chart for the vehicle interior set absolute humidity in relation to the flow chart shown in FIG. 3.

Next, the vehicle interior surface temperature Tn at the time tA, which is estimated as described above, is used to calculate a set vehicle interior absolute humidity Xset at which no dew is formed on the window glass in accordance with a flow chart shown in FIG. 6 (Step 4).

First, the air conditioner ECU 14 obtains a window glass dew point vehicle interior absolute humidity Xrmax as the limit vehicle interior absolute humidity at which no dew is formed on the vehicle interior surface of the window glass (Step S4a). That is, the psychrometric chart shown in FIG. 7 is used to determine the window glass dew point vehicle interior absolute humidity Xrmax as the dew point humidity of the window glass with respect to the vehicle interior surface temperature Tn calculated in Step S3.

The psychrometric chart represents the relationship of physical conditions such as air temperature (° C.), absolute humidity of the air (kg/kg), relative humidity (%), and enthalpy. The window glass dew point vehicle interior absolute humidity Xrmax may be determined by the calculation such that the relationship between the air temperature and the absolute humidity at the relative humidity of 100% is expressed by a polynomial, while the vehicle interior surface temperature Tn is used as a variable. Alternatively, the relationship may be stored in a look-up table to determine the window glass dew point vehicle interior absolute humidity Xrmax corresponding to the vehicle interior surface temperature Tn.

Subsequently, the set vehicle interior absolute humidity Xset, which is within a range that no dew is formed on the window glass and the vehicle interior is comfortable, is determined (Steps S4b to S4e).

Figure 7:
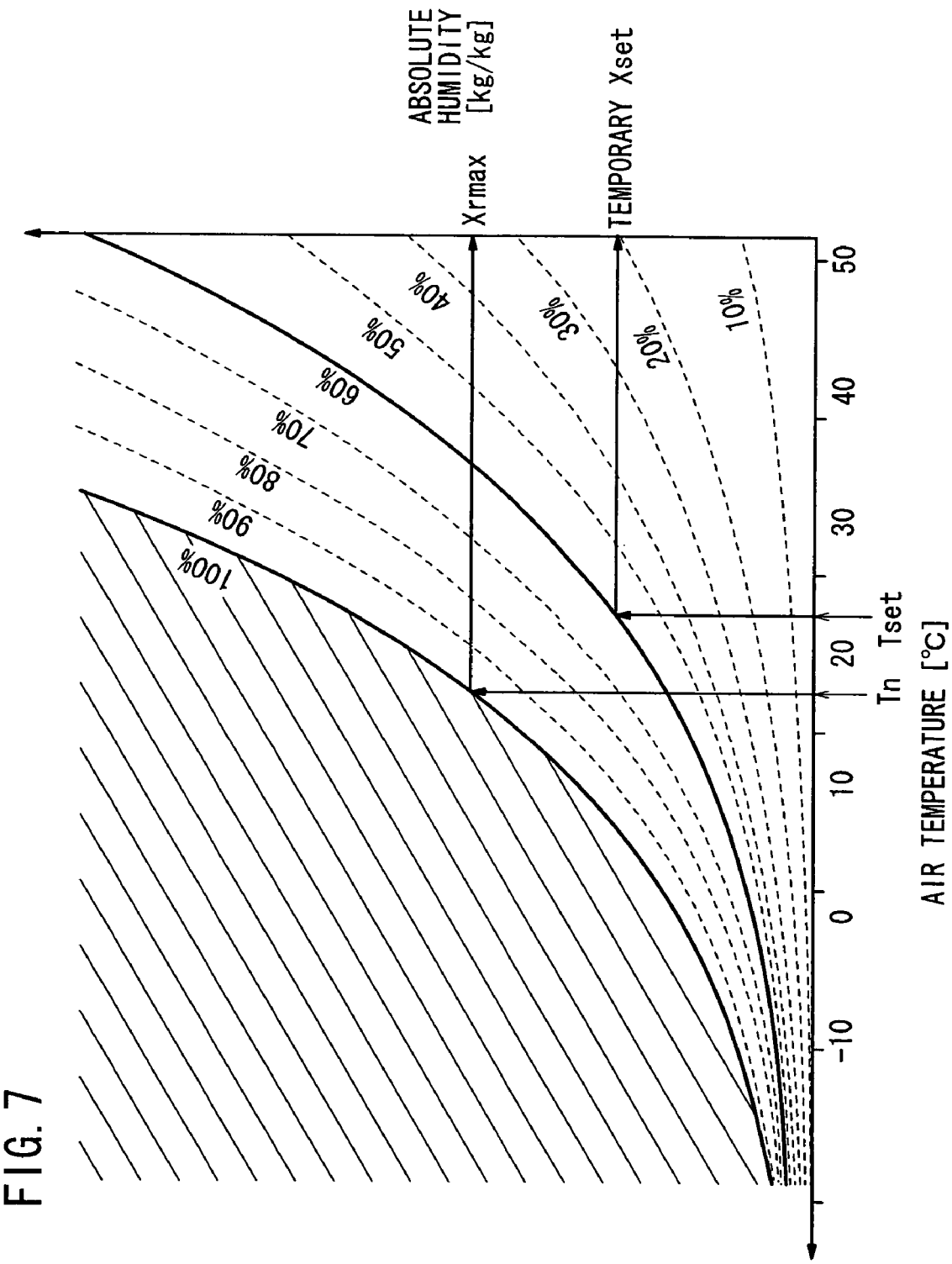
FIG. 7 is a psychrometric chart.

The air conditioner ECU 14 determines the set temporary vehicle interior absolute humidity (temporary Xset) from the psychrometric chart shown in FIG. 7 by using a set vehicle interior temperature Tset set by the passenger with the operation display unit 20 and a preset vehicle interior upper limit relative humidity (Step 4b). The vehicle interior upper limit relative humidity can be set to be, for example, about 60% of the upper limit relative humidity at which people usually feel comfortable. For example, the vehicle interior upper limit relative humidity may be set arbitrarily by the passenger by providing a setting section for the operation display unit 20.

In this procedure, the relationship between the absolute humidity and the two variables of air temperature and the relative humidity may be expressed by a polynomial, and the set vehicle interior temperature Tset and the vehicle interior upper limit relative humidity may be used as variables to determine the set temporary vehicle interior absolute humidity (temporary Xset) by means of the calculation. Alternatively, the relationship may be stored in a look-up table for each relative humidity, and the set temporary vehicle interior absolute humidity (temporary Xset) may be determined from the look-up table with respect to the selected relative humidity.

Subsequently, the window glass dew point vehicle interior absolute humidity Xrmax is compared with the set temporary vehicle interior absolute humidity (temporary Xset) (Step 4c). In this procedure, if Xrmax>temporary Xset, the air does not exceeds the relative humidity of 100%, even when the air at the set temporary vehicle interior absolute humidity (temporary Xset) is cooled in the vicinity of the window glass. Therefore, the window glass is not clouded. Further, the humidity in the vehicle passenger compartment is also within the range in which the passenger feels comfortable. On the other hand, if Xrmax≦temporary Xset, when the air at the set temporary vehicle interior absolute humidity (temporary Xset) is cooled in the vicinity of the window glass, the air exceeds the relative humidity of 100%. Therefore, the window glass is consequently clouded.

Accordingly, if Xrmax>temporary Xset, then Xset=temporary Xset (Step S4d). If Xrmax≦temporary Xset, then Xset=Xrmax (Step S4e). When the set vehicle interior absolute humidity Xset is set as described above, the window glass is not clouded, and the vehicle interior has comfortable humidity while requiring minimum cooling ability from the compressor 68.

Subsequently, an air blow required temperature Tao and an air blow required absolute humidity Xao to be blown from the blow ports 42, 44, 46, which are required to realize the set vehicle interior temperature Tset and the set vehicle interior absolute humidity Xset, are calculated (Steps S5, S6).

The air blow required temperature Tao is calculated as follows by using the set vehicle interior temperature Tset set by the passenger, the vehicle interior temperature Tr at the time tA detected by the vehicle interior temperature sensor 28, the outside air temperature Tam at the time tA detected by the outside air temperature sensor 22, and the solar radiation amount Ts at the time tA detected by the solar radiation amount sensor 24.

$$Tao = Ktset \cdot Tset - Ktr \cdot Tr - Ktam \cdot Tam - Kts \cdot Ts - Ct \tag{10}$$

Ktset: a set vehicle interior temperature coefficient;
Ktr: a vehicle interior temperature sensor coefficient:
Ktam: an outside air temperature sensor coefficient;
Kts: a solar radiation amount sensor coefficient;
Ct: a temperature calculation coefficient.

The air blow required absolute humidity Xao is calculated as follows by using the set vehicle interior absolute humidity Xset determined in Step S4 and a vehicle interior absolute humidity Xr at the time tA detected by the vehicle interior humidity sensor 30.

$$Xao = Kxset \cdot Xset - Kxr \cdot Xr - Kxam \cdot Tam - Cx1 \tag{11}$$

Kxset: a set vehicle interior absolute humidity coefficient;
Kxr: a vehicle interior absolute humidity coefficient;
Kxam: an outside air absolute humidity coefficient;
Cx1: a humidity calculation coefficient.

When the vehicle interior humidity sensor 30 is the sensor for detecting relative humidity, the vehicle interior absolute humidity Xr can be determined from the psychrometric chart shown in FIG. 7 by using the vehicle interior temperature Tr detected by the vehicle interior temperature sensor 28 and the relative humidity detected by the vehicle interior humidity sensor 30.

Figure 8:
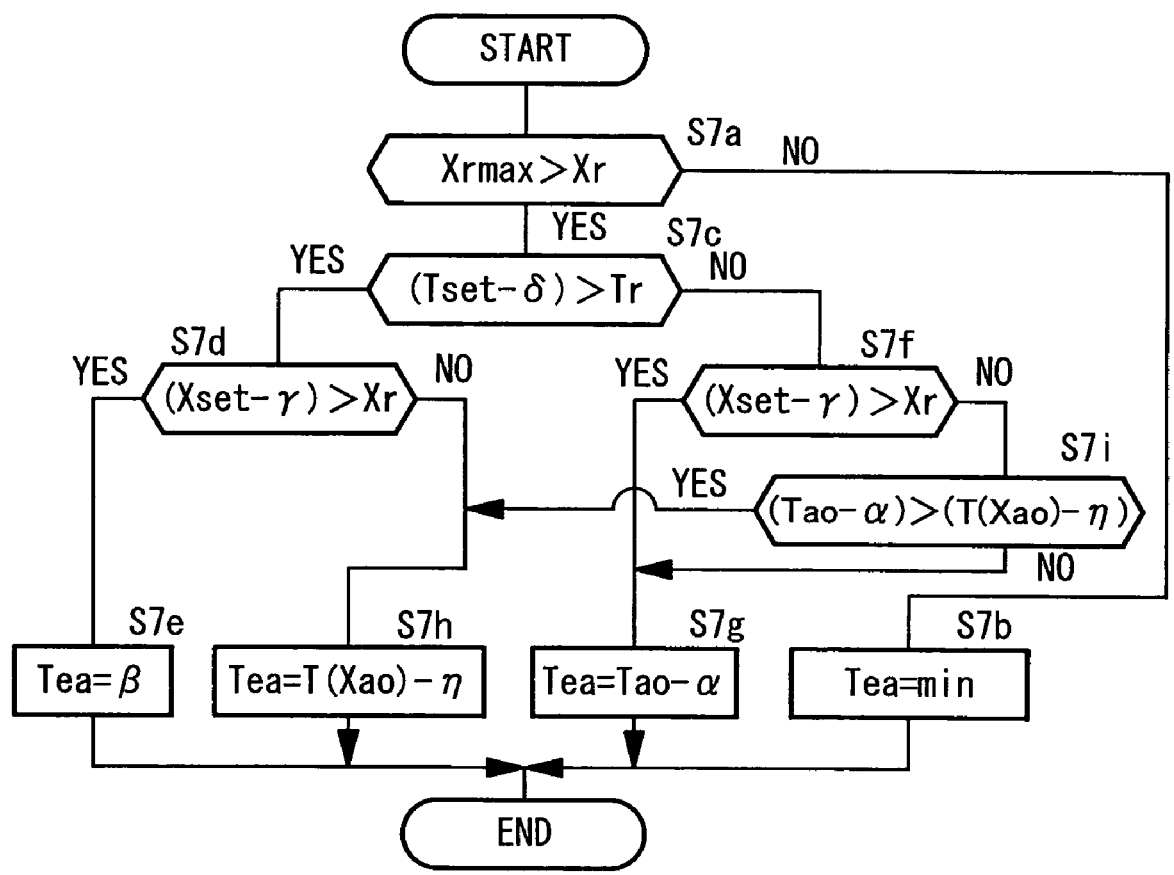
FIG. 8 is a calculation flow chart for the control temperature in relation to the flow chart shown in FIG. 3.

The air blow required temperature Tao and the air blow required absolute humidity Xao calculated as described above are used to calculate a control temperature Tea which can minimize the operation rate of the compressor 68 in accordance with a flow chart shown in FIG. 8 (Step S7).

When the compressor 68 is of a fixed capacity type and connected to the engine 18 via a clutch, then the control temperature Tea is a detected value of the vaporizer outlet temperature-detecting sensor 66 when the compressor 68 is disconnected from the engine 18, and a detected value of the vaporizer outlet temperature-detecting sensor 66, when the compressor 68 is connected to the engine 18, is Tea+θ (θ:constant). When the compressor 68 is of a variable capacity type, the control temperature Tea is the detected value of the vaporizer outlet temperature-detecting sensor 66.

The window glass dew point vehicle interior absolute humidity Xrmax determined in Step S4a is compared with the vehicle interior absolute humidity Xr detected by the vehicle interior humidity sensor 30. If Xrmax≦Xr (Step S7a), the window glass may be clouded when the vehicle interior air is cooled in the vicinity of the window glass. Therefore, in order to maximize the dehumidifying performance of the vaporizer 58, the control temperature Tea is set to a lower limit temperature min at which the vaporizer 58 is not frosted (Step S7b).

On the other hand, if Xrmax>Xr (Step S7a), the air does not exceed the relative humidity of 100%, even when the vehicle interior air is cooled in the vicinity of the window glass. Therefore, the window glass is not clouded. Accordingly, if (Tset−δ)>Tr (Step S7c) and (Xset−γ)>Xr (Step S7d) provided that δ represents a margin for temperature and γ represents a margin for humidity, it is unnecessary to perform any excessive dehumidification, and it is also unnecessary to perform any excessive cooling. Therefore, in order to drive the compressor 68 in minimum requirement, Tea=β (for example, about 20° C.)(Step S7e).

If Xrmax>Xr (Step S7a), (Tset−δ)≦Tr (Step S7c), and (Xset−γ)>Xr (Step S7f), it is judged that cooling is necessary. In this situation, assuming that α represents a margin with respect to the air blow required temperature Tao, Tea=Tao−α (Step S7g).

If Xrmax>Xr (Step S7a), (Tset−δ)>Tr (Step S7c), and (Xset−γ)≦Xr (Step S7d), it is judged that dehumidification is necessary. In this situation, Tea=T(Xao)−η (Step S7h) assuming that T(Xao) represents the temperature at which the air blow required absolute humidity Xao is obtained at the relative humidity of 100% and η represents a calculation coefficient of the temperature T(Xao).

If Xrmax>Xr (Step S7a), (Tset−δ)≦Tr (Step S7c), and (Xset−γ)≦Xr (Step S7f), it is judged that cooling and dehumidification are necessary. In this situation, Tao−α is compared with T(Xao)−η (Step S7i), and the smaller one is set to the control temperature Tea (Steps S7g, S7h).

After the control temperature Tea is set as described above, a capacity of the compressor 68 is adjusted when the compressor 68 is of a variable capacity type (Step S8). The air conditioner ECU 14 calculates an opening degree of the air mix damper 62 (Step S9). The air mix damper-driving unit 36 is driven to adjust the opening degree of the air mix damper 62. Further, the air conditioner ECU 14 calculates the voltage applied to the fan-driving unit 34 so that the fan 56 supplies necessary air amount (Step S10). The fan-driving unit 34 is driven at the voltage. Further, the air conditioner ECU 14 calculates the position of one or both of the mode-switching dampers 52, 54 in accordance with the mode set by the operation display unit 20 (Step S11). The mode-switching damper-driving unit 38 is driven to switch one or both of the mode-switching dampers 52, 54.

When the air conditioner unit 16 is driven as described above, air conditioning is controlled so that the vehicle interior temperature is the set vehicle interior temperature Tset, and the humidity is the set vehicle interior absolute humidity Xset. In this situation of the vehicle interior, the window glass is not clouded, and the upper limit of the comfortable humidity is not exceeded. Further, the compressor 68 is controlled by minimum driving force that is necessary to successfully maintain this state. Therefore, it is possible to save the energy consumed by the compressor 68.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A vehicle air conditioning apparatus for performing air conditioning control in a vehicle passenger compartment by controlling a heater and a cooler, said apparatus comprising:
an outside air temperature sensor which detects an outside air temperature Tam of a vehicle at time tA;
a vehicle interior temperature sensor which detects a vehicle interior temperature Tr of said vehicle at said time tA;
a solar radiation amount sensor which detects a solar radiation amount Ts on said vehicle at said time tA;
a stable vehicle interior surface temperature-calculator which calculates a vehicle interior surface temperature Tna of a window glass in a stable state at said time tA by an expression:

$$Tna = k1 \cdot Tr + k2 \cdot Tam + k3 \cdot Ts$$

wherein parameters k1 to k3 are determined by physical characteristics of said window glass and said vehicle passenger compartment;
a transient vehicle interior surface temperature-calculator which calculates a vehicle interior surface temperature Tn of said window glass in a transient state at said time tA by expressions:

$$Tn' = Tna - (Tna - Tn1)\exp(-\phi t)$$

$$Tn \approx Tn\tau'$$

wherein Tn1 is an initial value of said vehicle interior surface temperature Tn, t is elapsed time from a state of said initial value Tn1 to said time tA, τ is response delay time of temperature change of a vehicle interior surface of said window glass, and a parameter φ is determined by said physical characteristics of said window glass and said vehicle passenger compartment provided that Tnτ' is a vehicle interior surface temperature Tn' calculated at time before said time tA by said response delay time τ;
wherein said air conditioning control is performed by using said vehicle interior surface temperature Tn.

2. The vehicle air conditioning apparatus according to claim 1, further comprising:
a vehicle speed sensor which detects a speed V of said vehicle at said time tA,
said parameters k1 to k3 and φ being set as functions of said vehicle speed V.

3. The vehicle air conditioning apparatus according to claim 1, further comprising:
an environmental condition-setting unit which sets an environmental condition for said vehicle,
said parameters k1 to k3 and φ being set corresponding to said environmental condition.

4. The vehicle air conditioning apparatus according to claim 3, wherein said environmental condition-setting unit is a wiper-driving unit which outputs a wiper operation signal to indicates that a wiper of said vehicle is operated.

5. The vehicle air conditioning apparatus according to claim 1, wherein said stable vehicle interior surface temperature-calculator calculates said vehicle interior surface temperature Tna at said time tA by an expression:

$$Tna = [(Kn\lambda + 2KnLKg)/(Kn\lambda + Kg(\lambda + 2KnL))]Tr + [\lambda Kg/Kn\lambda + Kg(\lambda + 2KnL))]\xi Tam + 1/A[(\lambda + LKg)/(Kn\lambda + Kg(\lambda + 2KnL))]\varepsilon Ts$$

L: a window glass thickness;
Kg: an outside air coefficient of thermal conductivity;
Kn: a vehicle interior coefficient of thermal conductivity;
λ: a coefficient of thermal conductivity of a glass;
A: a glass surface area;
ξ: a water droplet temperature changing rate;
ε: a solar radiation amount conversion coefficient.

6. The vehicle air conditioning apparatus according to claim 5, further comprising:
a vehicle speed sensor which detects a speed V of said vehicle at said time tA; and
an environmental condition-setting unit which sets an environmental condition for said vehicle, wherein
said stable vehicle interior surface temperature-calculator sets a coefficient of thermal conductivity changing rate $\psi$ and said water droplet temperature changing rate $\xi$ to predetermined values in accordance with said environmental condition, and said stable vehicle interior surface temperature-calculator sets said outside air coefficient of thermal conductivity Kg to $\psi(xV+y)$ at said time tA by using parameters x and y in accordance with said coefficient of thermal conductivity changing rate $\psi$ and said vehicle speed V.

7. The vehicle air conditioning apparatus according to claim 1, further comprising:
a vehicle speed sensor which detects a speed V of said vehicle at said time tA; and
an environmental condition-setting unit which sets an environmental condition for said vehicle, wherein said transient vehicle interior surface temperature-calculator makes the following approximation by an expression:

$$\exp(-\phi t) \approx \omega(wV+z)$$

provided that said elapsed time t is a sampling time interval for said vehicle air conditioning apparatus;
wherein a change ratio $\omega$ is set to a predetermined value in accordance with said environmental condition, and said vehicle interior surface temperature Tn is calculated by using parameters w and z.

8. The vehicle air conditioning apparatus according to claim 1, wherein said transient vehicle interior surface temperature-calculator regards said vehicle interior surface temperature Tna at calculation start time t1 as said vehicle interior surface temperature Tn, when said elapsed time t, which is started from said calculation start time t1 for said vehicle interior surface temperature Tn, does not elapse said response delay time $\tau$.

* * * * *